United States Patent
Coenraets

(10) Patent No.: US 8,708,025 B2
(45) Date of Patent: Apr. 29, 2014

(54) DEVICE FOR COVERING A SURFACE

(75) Inventor: Benoît Coenraets, Wauthier-Braine (BE)

(73) Assignee: Becoflex S.A., Wauthier-Braine (BE)

( * ) Notice: Subject to any disclaimer, the term of this patent is extended or adjusted under 35 U.S.C. 154(b) by 323 days.

(21) Appl. No.: 13/129,010

(22) PCT Filed: Nov. 3, 2009

(86) PCT No.: PCT/EP2009/064550
§ 371 (c)(1),
(2), (4) Date: Jul. 25, 2011

(87) PCT Pub. No.: WO2010/054960
PCT Pub. Date: May 20, 2010

(65) Prior Publication Data
US 2011/0290433 A1     Dec. 1, 2011

(30) Foreign Application Priority Data
Nov. 12, 2008   (BE) .................................. 2008/0612

(51) Int. Cl.
*A47G 5/02*       (2006.01)
*A47H 1/00*       (2006.01)
*E06B 9/56*       (2006.01)
*E04H 4/00*       (2006.01)

(52) U.S. Cl.
USPC ............................. 160/311; 160/273.1; 4/502

(58) Field of Classification Search
USPC .......... 160/242–261, 309–311; 242/389, 399; 4/498, 500, 502, 503, 504
See application file for complete search history.

(56) References Cited

U.S. PATENT DOCUMENTS 3,574,979 A    4/1971  Chan
4,001,900 A    1/1977  Lamb
(Continued)

FOREIGN PATENT DOCUMENTS

BE    1018228 A3    7/2010
BE    1018229 A3    7/2010
(Continued)

*Primary Examiner* — Katherine Mitchell
*Assistant Examiner* — Jeremy Ramsey
(74) *Attorney, Agent, or Firm* — Laurence A. Greenberg; Werner H. Stemer; Ralph E. Locher

(57) ABSTRACT

The present invention relates to a device for covering a surface comprising a drum mounted to rotate and able to wind up or unwind a cover. Said drum is mounted on a longitudinal-translation mechanism comprising: (a) two flexible belts fixed only at each of their ends to the four corners of the surface that is to be covered and arranged along the two lengths of the perimeter of the surface that is to be covered; and (b) a carriage transversely overhanging the surface to be covered and supporting the drum, said carriage comprising, at each of its ends: (i) a drive wheel the rotation axle of which is parallel to that of said drum; (ii) at least two casters resting on the surface directly adjacent to the surface that is to be covered and allowing for the longitudinal translational movement of the carriage, these being mounted on each side of the drive wheel and together with the latter constituting a triangle of which the drive wheel forms the vertex; so that the sections of each flexible belt comprised between their points of attachment and the casters, are pressed against the length of the periphery of the surface that is to be covered, and so that the section of each belt comprised between the at least two casters runs over the drive wheel without slipping.

10 Claims, 3 Drawing Sheets

(56) References Cited

U.S. PATENT DOCUMENTS

| | | | | |
|---|---|---|---|---|
| 4,195,370 | A | * | 4/1980 | Budd .................. 4/502 |
| 4,466,143 | A | * | 8/1984 | Lamb .................. 4/502 |
| 4,494,256 | A | * | 1/1985 | Radtke et al. .......... 4/502 |
| 5,799,342 | A | * | 9/1998 | Last .................... 4/502 |
| 5,930,848 | A | | 8/1999 | Last |
| 7,048,029 | B2 | * | 5/2006 | Rieder et al. .......... 160/188 |
| 8,418,279 | B2 | * | 4/2013 | Coenraets ............. 4/502 |
| 2001/0023506 | A1 | * | 9/2001 | Mathis et al. .......... 4/502 |
| 2005/0097834 | A1 | | 5/2005 | King et al. |

FOREIGN PATENT DOCUMENTS

| | | |
|---|---|---|
| BE | 1018230 A3 | 7/2010 |
| CA | 2115113 A1 | 8/1995 |
| EP | 1719858 A2 | 11/2006 |
| EP | 2037060 A1 | 3/2009 |
| FR | 2743502 A1 | 7/1997 |
| FR | 2803769 A1 | 7/2001 |
| FR | 2893651 A1 | 5/2007 |
| FR | 2908402 A1 | 5/2008 |
| FR | 2918654 A1 | 1/2009 |
| GB | 2199749 A | 7/1988 |
| WO | 2005026473 A1 | 3/2005 |

* cited by examiner

DEVICE FOR COVERING A SURFACE

BACKGROUND OF THE INVENTION

1. Field of the Invention

The invention relates to a device for covering a surface that is easy to use and better meets the requirements of the application concerned.

2. Technical Background

Covers are applied to surfaces for reasons which are dependent on the nature of these surfaces.

Hence, in the case of a basin such as a swimming pool, the cover may prevent contamination by leaves or by animals, may save energy, water and reagents, and may or needs to ensure the safety of people, especially children. In a basin for the desalination or other treatment of a fluid, a cover prevents dilution of liquid due to rainwater or excessive evaporation due to heat.

In the case of a sports ground such as a clay court or grass court outdoor tennis court, a cover protects the court against inclement weather, particularly intermittent rain.

Furthermore, a vehicle body is covered particularly to ensure the stability of the load in the face of the suction caused by the movement of the vehicle and to protect this load against inclement weather.

Covers are also used as blinds for greenhouses, conservatories or vehicle windows to prevent any overheating inside, and as protection against the sun for patio awnings.

In all these scenarios, what is generally being sought is an economical cover device that allows covering and uncovering to be done easily, dependably, repeatably and quickly, with the need for a minimum amount of human intervention.

A very basic first device used in the case of a swimming pool comprises a cover which may or may not be inflatable which is unrolled, stretched out and fixed manually to the edges of the swimming pool. This type of device is illustrated for example in documents U.S. Pat. No. 6,691,334, GB 2 379 163 and FR 2 652 373. It is clear that in this instance, given the handling and storage required, only fairly small-sized swimming pools are involved.

For surfaces of larger dimensions recourse may be had to cover devices which also have a drum fixed to one of the transverse ends of the surface that is to be protected. The cover is deployed manually by pulling, being unrolled from the drum, to cover the surface. The weight and the dimensions of the cover require the intervention of a number of individuals in order to fit it correctly. The cover is removed by winding it up around the drum by rotation: the cover is thus removed from the surface by sliding along it. The rotation of the drum in order to remove the cover is performed manually or using an electric motor that is powerful enough to be able to pull the fully deployed cover. It should be emphasized that ease of deployment of the cover, particularly in the case of a swimming pool, is a contributory factor in the safety thereof, because any handling that is awkward discourages its use.

In order to eliminate human intervention, (fully) automatic devices have been proposed; the cover is wound around a motorized drum that can be used for removing it, the drum being fixed to one of the transverse ends of the surface that is to be protected. The cover is deployed by pulling it from its visible end, using automatic pulling means of the rack or chain or hauling cable type, with or without a return pulley, the cover perhaps being guided by guideways arranged at the longitudinal ends of the surface that is to be covered; the cover then slides over the surface, covering it. Likewise, as the cover is removed, it slides over the surface that is to be uncovered as it winds up around the drum. This automatic cover device is illustrated notably in the following documents: U.S. Pat. No. 3,574,979, GB 2 199 741, U.S. 2005/0097834, CA 2 115 113, U.S. 2001/0023506, U.S. Pat. No. 5,930,848, U.S. Pat. No. 4,001,900 and on the website www.aquatop.be.

The two types of cover devices with a drum mentioned hereinabove have the main disadvantage of making the cover slide, which cover is dragged along the surface that is to be protected as it is being deployed and as it is being removed, thus causing premature wear of this cover together with additional work due to the friction thus generated.

To alleviate this disadvantage, there is an alternative type of cover device with a drum, the motorized drum now being mounted on a longitudinal-translation mechanism. This mechanism moves the drum over the surface that is to be covered, allowing the cover to be literally "laid" onto the surface, as it is deployed, by simultaneously unrolling it from the drum while it is being moved longitudinally, then allowing it to be lifted, as it is removed, while simultaneously winding it up onto the drum. The cover therefore slides over the surface neither while it is being deployed nor while it is being removed. The cover device also comprises a system for fixing the cover to a transverse end of the surface that is to be covered such that the translational and rotational movements of the drum cause the cover to be unwound or wound up above the surface that is to be covered.

In this application, the terms "longitudinal", "transverse" and derivatives thereof refer respectively to the direction of travel of the drum and to the direction of the axis of revolution thereof.

Examples of automatic or semi-automatic devices of this type are disclosed for example in the following documents: WO2005/026473, FR 2 900 951, DE 2 257 231, FR 2 893 651, FR 2 789 425, FR 2 803 769, FR 2 743 502, EP 1 719 858, FR 2 908 402 and BE 2008/0417/0418/0419. Moreover, a completely manual alternative form of the drum mounted for longitudinal translation is illustrated in documents WO2007/036625 and U.S. Pat. No. 4,195,370.

In the mobile-drum cover devices illustrated hereinabove, the longitudinal-translation mechanism can be set in motion either entirely by hand, or semiautomatically or automatically, notably using a gripping member, a cable or a rack in which a pinion meshes.

Racks are advantageous because they do not require return pulleys which are always difficult to conceal and which may easily become jammed. An example of a rack-type longitudinal-translation system is described in applications BE 2008/0417/0418/0419 filed by the same applicant, in which driven cogged wheels mesh with straight racks laid on the ground. However, contact between the drive wheels and the rack is over just a few teeth, and there is still a high risk of slipping of a pinion on the rack with which it meshes, and this slippage would result in the deviation of the travel of the drum.

There therefore still remains a need regarding an automatable system for covering a surface, equipped with a mechanism for the longitudinal translational movement of the drum with a substantial reduction in the risk of slippage between a pinion and the rack with which it meshes, and therefore deviating the travel of the drum.

BRIEF SUMMARY OF THE INVENTION

It is an object of the invention to afford a device for covering a surface that is easy to implement and is equipped with a longitudinal-translation mechanism capable of moving without deviating from its runway path.

The invention is as defined in the main claim, and comprises a device for covering a substantially rectangular surface, comprising a drum mounted to rotate and able to wind up or unwind a cover. Said drum is mounted on a longitudinal-translation mechanism comprising:

(a) two flexible belts fixed only at each of their ends to the four corners of the surface that is to be covered and arranged along the two lengths of the perimeter of the surface (3) that is to be covered; and (b) a carriage transversely overhanging the surface to be covered and supporting the drum, said carriage comprising, at each of its ends:

(i) a drive wheel the rotation axle of which is parallel to that of said drum;

(ii) at least two casters resting on the surface directly adjacent to the surface that is to be covered and allowing for the longitudinal translational movement of the carriage, these being mounted on each side of the drive wheel and together with the latter constituting a triangle of which the drive wheel forms the vertex;

so that the sections of each flexible belt comprised between their points of attachment and the casters, are pressed against the length of the periphery of the surface that is to be covered, and so that the section of each belt comprised between the at least two casters runs over the drive wheel without slipping.

The advantage of the invention is that the flexible belts that move the carriage via its drive wheels, by running over these, are wrapped around them over a large enough angle to guarantee a reliable hold, that is to say without any slippage of the belt on the periphery of the drive wheel.

According to a preferred embodiment, the absence of slipping between the drive wheels and the belts is ensured by one of the following combinations: a pinion with a belt that is notched on one face; a sprocket with a chain; a wheel with a rough rim and a belt that is rough on one side; a wheel comprising recesses on the circumference of its rim with a belt that has protrusions able to nest in said recesses.

Advantageously, the device according to the invention comprises rails positioned along the two lengths of the perimeter of the surface that is to be covered, in which rails the sections of the belts located between their points of attachment and the casters engage. This measure both allows these belt sections to be protected and allows the casters to be guided appropriately.

If the device comprises rails, they preferably have a substantially U-section or G-section, that is to say comprise a flange partially closing off one side of the opening of the section piece, or a C-section, that is to say comprise two flanges partially closing off each side of the opening of the section piece.

Advantageously, the device according to the invention comprises means of continuously inserting the longitudinal edges of the cover into each of the rails as it is gradually unwound from the drum, so that said edges are jammed reversibly in the rails through the action of the belts. These arrangements make it possible, as the cover is being unwound, for it to be simultaneously laid (and therefore without making it slide) and fixed down firmly and continuously along the entire deployed length thereof. In particular, in the case of a swimming pool, anybody getting onto the cover would then be held back by the longitudinal edges thereof and would not therefore be able to fall into the water. Furthermore, the sealing of the cover along its longitudinal edges prevents small animals such as mice or snakes from being able to enter the swimming pool.

According to a preferred embodiment of the invention, each rail is formed of a G-section with the flange located on the side of the rail adjacent to the surface that is to be covered, and each longitudinal edge of the cover is provided with a bead which, under the combined action of the belt entering the rail and of the flange of the section piece, reversibly jams the cover in each rail as the cover is gradually unwound. These measures improve the stability of the cover once it has been laid because this cover is then retained more effectively in the rails.

Advantageously, the device according to the invention comprises rollers guiding the lip formed by each of the longitudinal edges of the cover in the opening of the section piece that forms each rail. These rollers may apply a transverse tensile stress to the cover as it is being unwound, which in many applications, such as applications to a swimming pool or a truck tarpaulin, affords advantages in terms of esthetics, safety, thermal insulation, drainage or maintenance.

Whereas the longitudinal-translation mechanism can be actuated manually, according to another embodiment it comprises at least one motor to turn the drive wheels. That means that the device according to the invention can be at least partially automated, something which is particularly advantageous in the case of a cover of relatively large size. As far as swimming pools for example are concerned, safety is dependent on this because awkward handling operations would soon discourage users from deploying the cover every time they should.

According to another embodiment, the device according to the invention comprises means of modifying the relative rotational speed of the drum and of the drive wheels. Specifically, in the simplest of cases, the motor rotates at a constant speed, driving the longitudinal movement of the drum at a constant speed. It is generally advantageous to use just one motor driving, on the one hand, the longitudinal movement of the carriage and, on the other hand, the rotation of the drum, at least in the direction of winding up (that is to say as the cover is removed from the surface that is to be covered). However, the diameter of the drum changes with the length of cover accumulated thereon. Said means include, for example, a freewheeling of the drum about its rotation axle in the direction of unwinding of the cover. Specifically, during unwinding, the rotation of the drum is driven by the pulling force applied by the section of cover already laid and which covers part of the surface that is to be covered, and the motor is therefore not needed to drive said rotation. A free wheel here is therefore a particularly advantageous solution for automatically adapting the rotational speed of the drum to the decreasing diameter of said drum for a constant or non-constant speed of longitudinal translational movement.

Said modifying means may also comprise means of transmitting the rotational movement of the drive wheels to the drum by applying a friction force such that the rotation of the drum and of the drive wheels is in phase when the resistance to rotation of the drum afforded by the cover as it is being wound on to the drum is below a given value and is differentiated when the resistance exceeds said value, the rotational speed of the drum then being lower than that of the drive wheels. These transmission means thus make it possible to synchronize the translational speed of the carriage and the speed of winding-up of the cover.

According to another embodiment, said friction force is applied to the drum via a belt or by circumferential contact by two rotating rollers.

Advantageously, the rotation axle of the drum is coaxial with that of the drive wheels. This gives the cover device according to the invention a compact design.

Of course, the rotation axle of the drum may be distinct from that of the drive wheels.

According to another advantageous embodiment, the casters of the carriage engage in the rails and are mounted on the carriage in such a way that they are free to move transversely over a certain distance along their axle in order to compensate for deviations in the parallelism of the rails. These deviations are inevitable in the long term if, for example in the case of sports grounds or swimming pools, the rails are laid on the ground (grass, gravel) or on a wooden edging deck, which move over time.

The device according to the invention may comprise means for the continuous cleaning of each rail, said means being situated between the casters. This measure prevents any build-up of dirt in the rails and thus guarantees, over time, the possibility of inserting the longitudinal edges of the cover as it is unwound and the possibility of engaging the belts in these rails.

These aspects, together with other aspects of the invention, will be clarified in the detailed description of some particular embodiments of the invention, reference being made to the drawings of the figures in which:

DESCRIPTION OF THE INVENTION

Figure 1:
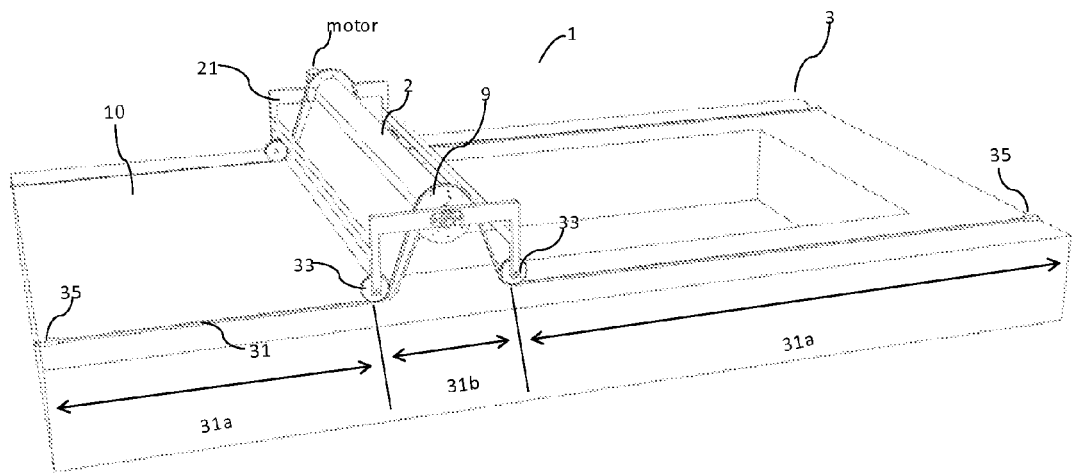
FIG. 1 is a perspective overall view of a surface with a drum mounted on a carriage.

As depicted in FIG. 1, the automatic device (1) for covering a surface (3) according to the invention comprises a cover (10) intended to protect said surface (3). The device (1) makes it possible to cover substantially rectangular surfaces notably encompassing the contour of a basin of water such as a swimming pool, a water treatment basin, a waste water purification station, a retention basin, a desalination plant, etc. However, the invention may be used in any field that requires the covering of a surface, for example a clay court or grass court tennis court, the body of a vehicle, a glazed surface of a greenhouse, a window of a vehicle such as a train or bus, or a conservatory, etc. In general, throughout the present application, "surface" therefore means any area delineated by a perimeter. A "substantially rectangular surface" in the present context includes any quadrilateral having at least two parallel opposite sides (denoted as the "lengths" or the "longitudinal edges") and may therefore equally form a lozenge shape, a parallelogram or a trapezium. For preference, the surface (3) is a rectangle with each of its opposite sides parallel and forming right angles.

The device (1) comprises a drum (2) which has a length at least equal to the width of the cover (10), this cover having to be of sufficient length and width to cover the entire surface (3) that is to be protected, when it is deployed. The drum (2) is mounted on a longitudinal-translation mechanism comprising a carriage (21) transversely overhanging the surface (3) to be covered and comprising at each of its ends a drive wheel (9) the rotation axle of which is parallel to that of said drum (2) and at least two casters (33) resting on the surface directly adjacent to the surface (3) that is to be covered and allowing for the longitudinal translational movement of the carriage (21); the casters (33) are mounted on each side of the drive wheel (9) and together with the latter constitute a triangle of which the drive wheel forms the vertex. The longitudinal-translation mechanism also comprises two flexible belts (31) arranged along the two lengths of the perimeter of the surface (3) that is to be covered and fixed only at each of their ends (35) to the four corners of the surface that is to be covered.

Each belt (31) is pressed against the corresponding longitudinal edge of the surface that is to be covered along its sections (31a) comprised on each side of the carriage between the attachment points (35) and the casters (33), while in its section (31b) comprised between the at least two casters (33) of the carriage (21) it passes over the drive wheel (9) without slipping.

Figure 2:
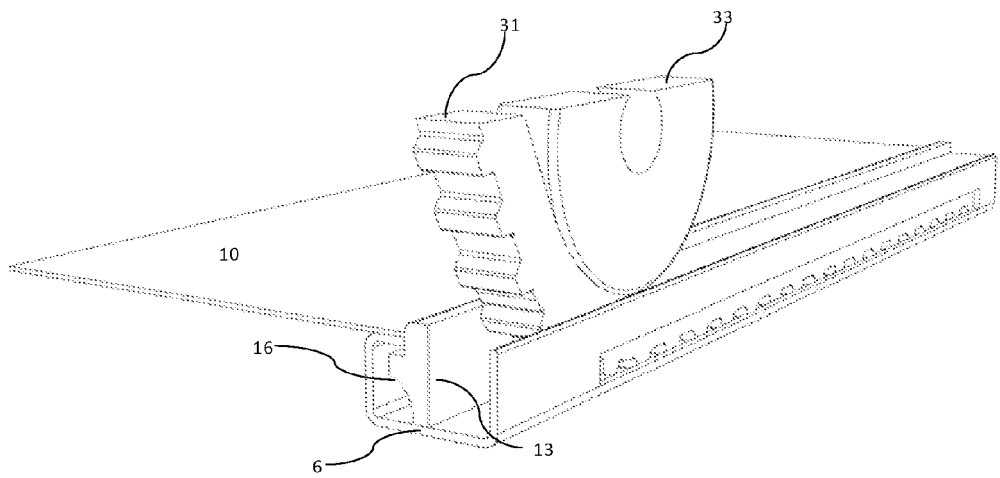
FIG. 2 is a perspective view of a notched belt jamming the edge of the cover into the corresponding rail.

When the drive wheels (9) are turning under the action of a motor or of a cranking handle, they travel without slipping along the belts (31) which progress in the manner of a wave along the longitudinal edges of the surface (3), thus causing the longitudinal movement of the carriage. It is important to ensure slip-free contact between the belts (31) and the respective drive wheels (9) in order, on the one hand, to avoid inefficient use of the power of the motor and, on the other hand, to avoid the carriage deviating from its course. For that, there are a number of possible solutions such as combining a pinion or sprocket (9) meshing with a belt (31) that is notched on one face or with a chain (31); or a wheel (9) with a rough rim with a belt (31) that is rough on one face; or a wheel (9) comprising recesses on the circumference of its rim in which protrusions distributed along the length of the belt (31) can fit. Any other means known to those skilled in the art allowing slip-free contact between a belt and a drive wheel may be employed in the present invention. A notched belt (31) example is depicted in FIG. 2. The belts may be made of any material suited to the application in question: metal, natural or synthetic textile materials, natural or synthetic polymers. They may also take the form of metal or synthetic chains.

The drum (2) has two directions of rotation: the first direction of rotation allows it to unwind the cover (10) to deploy it and cover the surface (3) that is to be protected, and the second direction of rotation, the opposite to the first, allows it to wind the cover (10) up in order to remove it and provide access to said surface (3).

FIG. 2 shows a belt (31) engaging in a guide rail (6) under the action of a caster (33) and thus jamming the lip-forming longitudinal edge (13) of the cover (10) as it is unwound. The use of guide rails (6) may be advantageous because it ensures the straight path of the carriage as it moves and, on the other hand, because it allows the sections (31a) of the belts comprised on each side of the carriage to be inset. This is particularly advantageous in the case of surfaces accessible to the public, as in the case of swimming pools, because there is then no risk of a foot becoming caught under the belt which is pressed firmly against the ground, with the risk of damaging the system or, worse, injuring somebody. The variant depicted in FIG. 2 is particularly advantageous because not only are the sections (31a) of the belt set into the rail (6), but the longitudinal edges of the cover (10) become jammed in the rail as it is gradually deployed. Said longitudinal edge (13) here is provided with a bead (16) which, through the combined action of the belt becoming incorporated into the rail (6) and of the flange of the G-section, reversibly jams the cover (10) into each rail (6) as it is gradually unwound. Other rail sections are obviously possible, such as C-sections or U-sections but the G-section is particularly advantageous when the longitudinal edges (13) of the cover (10) have to be jammed in place when the surface is covered over. The rails may be visible, simply laid along the edge of the surface that is to be covered or, for a better esthetic look, may be inset (for example in the case of swimming pools, the rails may be incorporated into the edging deck, their upper surface being flush with the surface of the deck).

Figure 3:
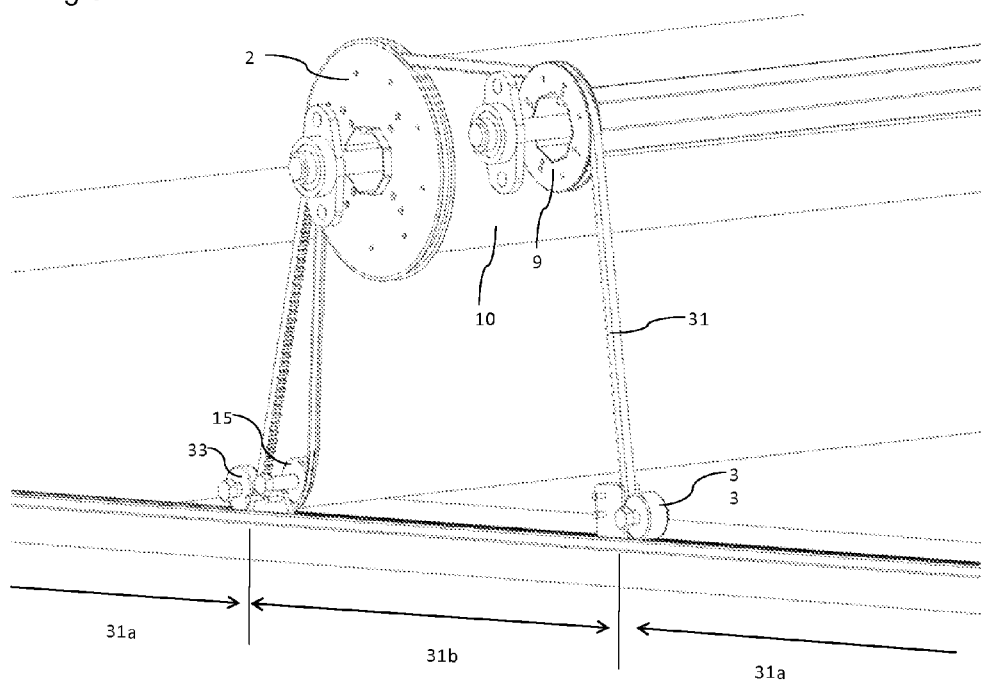
FIG. 3 is a perspective view of the cover device in which the rotation axle of the drum is separate from that of the drive wheels.

Unlike FIG. 1 in which the axle of the drum (2) is coaxial with that of the drive wheels (9), FIG. 3 relates to a cover device (1) in which the axle of the drum (2) is parallel to, but distinct from that of the drive wheels (9). This variant, although bulkier than the one illustrated in FIG. 1 in which just one drum can be seen, is, however, a far simpler design. In this configuration, the radial rotational speed of the drum (2) can be modified very simply in order to synchronize the rotational speed of the drive wheel with the tangential speed of the drum as a function of its size which is dependent on the length of cover wound up on it. Specifically, all that is required is for the drum (2) to be interposed between the drive wheel (9) and one of the casters (33) and for the belt (31) to be run around the circumference of a wheel that rotates as one with the drum. It is important to ensure that, unlike the drive wheel which accepts the belt without any slippage, contact between the belt and the wheel of the drum should allow a certain amount of slipping. Thus, as the cover is wound up onto the drum (that is to say as the cover is removed from the surface), friction between the belt and the wheel of the drum causes the latter to rotate, allowing the cover to be wound up as the carriage gradually moves under the action of the drive wheel and the belt. However, as the cover is wound onto the drum, the diameter of the drum increases and, for a constant radial rotational speed, its tangential rotational speed increases, generating a pulling force on the cover the rate of winding-up of which is dependent on the rate of travel of the carriage. When the pulling force applied by the cover exceeds the friction force between the belt and the wheel of the drum, the belt will then slip on the rim of the wheel which can reduce its radial rotational speed and thus synchronize the tangential rotational speed of the drum with the radial rotational speed of the drive wheel. This has the effect of releasing the tensions in the cover below the friction force between the belt and the wheel of the drum, which is then once again rotationally driven. This extremely simple system for regulating the speeds of the axles of the drum and of the motor is astonishingly effective and durable.

Other systems for synchronizing the rotational speeds of the drum and of the motor are possible, for example by circumferential contact of two rotating rollers or using any other system known to those skilled in the art, such as, for example, those described in documents FR 2893651, DE 2257231 or FR 2908402. It is also possible to use two motors, one rotating at constant speed and driving the longitudinal translational movement of the carriage and the second fitted with a microprocessor controlling the rotational speed of the drum as a function of its diameter. Of course this solution is far more expensive than the one depicted in FIG. 3.

Figure 4:
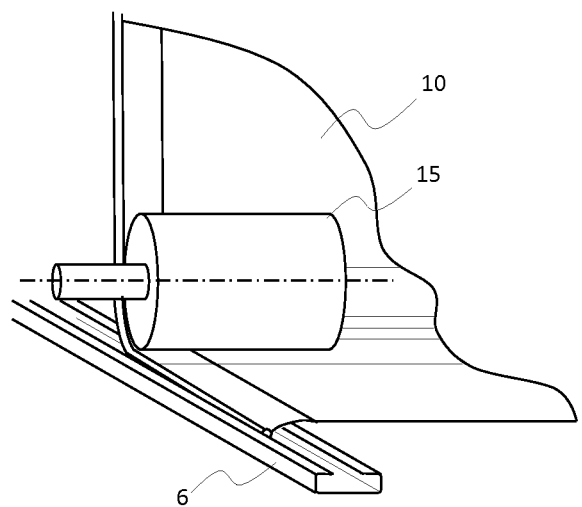
FIG. 4 is a perspective view of a roller guiding a lip formed by a longitudinal edge of the cover in an opening of a section piece forming a rail.

As is seen in FIG. 4, a roller 15 guides the lip formed by the longitudinal edge of the cover 10 in an opening of a section piece forming the rail 6.

Furthermore, when the device comprises rails (6), it may be advantageous for the casters (33) to be mounted on the carriage (21) in such a way that they are free to move transversely over a certain distance along their axis so as to compensate for deviations in parallelism of the rails (6). It is also advantageous for the device to be equipped with means of continuously cleaning each rail, said means being situated between the casters (33).

The invention claimed is:

1. A device for covering a substantially rectangular surface having two mutually opposite and parallel longitudinal sides and two mutually opposite transverse sides being substantially normal to the two longitudinal sides, the sides defining a perimeter with four corners, the device comprising:
  a cover having longitudinal edges;
  a drum having a longitudinal axis and being configured to wind up or unwind said cover; and
  a longitudinal-translation mechanism on which said drum is mounted for rotation about said longitudinal axis, said longitudinal-translation mechanism including:
    a) rails positioned along the two longitudinal sides of the perimeter of the surface to be covered;
    b) two flexible belts each including first and second ends and each extending from a first one of the corners to a second one of the corners along a respective one of the longitudinal sides of the perimeter of the surface to be covered, said belts being fixed only at each of said ends at a respective point of attachment to a respective one of the first and second corners;
    (c) a carriage overhanging the surface to be covered, extending substantially parallel to the transverse sides and supporting said drum, said carriage having ends each including:
      (i) a drive wheel having a rotation axis parallel to said longitudinal axis of said drum; and
      (ii) at least two casters resting on and being directly adjacent the surface to be covered and configured to allow for longitudinal translational movement of said carriage, said at least two casters being mounted on each respective side of said drive wheel and together with said drive wheel constituting a triangle with said drive wheel forming a vertex of said triangle;
    d) each of said flexible belts including side sections each disposed between a respective one of said points of attachment and a respective one of said casters and a central section disposed between said at least two casters, said side sections each being pressed against a respective one of the longitudinal sides of the periphery of the surface to be covered and said central section of each of said belts running over a respective one of said drive wheels without slipping; and
    e) at least one roller configured to continuously guide and insert each of said longitudinal edges of said cover into a respective one of said rails upon said cover being gradually unwound from said drum and to reversibly jam said edges in said rails due to action of said belts.

2. The device according to claim 1, which further comprises a combination configured to ensure an absence of slipping between said drive wheels and said belts, said combination being one of:
  a pinion with a belt being notched on one face; or
  a sprocket with a chain; or
  a wheel with a rough rim and a belt being rough on one side; or
  a wheel having a rim with a periphery and recesses on said periphery and a belt having protrusions configured to nest in said recesses.

3. The device according to claim 1, wherein each of said rails is formed as a profile including an opening facing the surface to be covered, said profile having a substantially U-shaped section, G-shaped section including a flange partially closing off one side of said opening of said section, or C-shaped section including two flanges partially closing off each side of said opening of said section.

4. The device according to claim 1, wherein each of said rails is formed as a G-shaped section with a flange located on a side of said rail adjacent the surface to be covered, and each of said longitudinal edges of said cover has a bead configured to reversibly jam said cover in each respective one of said rails under a combined action of said belts entering said rails and of said flange of said G-shaped section as said cover is gradually unwound from said drum.

5. The device according to claim 3, wherein each of said longitudinal edges of said cover forms a lip, and guide rollers each guide a respective one of said lips in said opening of said section forming a respective one of said rails.

6. The device according to claim 1, which further comprises at least one motor configured to turn said drive wheels.

7. The device according to claim 1, wherein said drum is configured to rotate freely about said longitudinal axis in an unwinding direction of said cover, to modify relative rotational speeds of said drum and said drive wheels.

8. The device according to claim 1, wherein said longitudinal axis of said drum is coaxial with said rotation axes of said drive wheels.

9. The device according to claim 2, wherein said longitudinal axis of said drum is distinct from rotation axes of said pinions or sprockets.

10. The device according to claim 1, wherein said casters have axes, are engaged in said rails and have a mounting on said carriage allowing said casters to be free to move transversely over a certain distance along said axes thereof to compensate for deviations in parallelism of said rails.

* * * * *